United States Patent
Chen (10) Patent No.: US 12,231,530 B2
(45) Date of Patent: Feb. 18, 2025

(54) METHOD FOR PERFORMING POWER DISTURBING OPERATION TO REDUCE SUCCESS RATE OF CRYPTOSYSTEM POWER ANALYSIS ATTACK, CRYPTOSYSTEM PROCESSING CIRCUIT, AND ELECTRONIC DEVICE

(71) Applicant: Realtek Semiconductor Corp., HsinChu (TW)

(72) Inventor: Yuefeng Chen, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 211 days.

(21) Appl. No.: 17/885,581

(22) Filed: Aug. 11, 2022

(65) Prior Publication Data

US 2023/0231696 A1 Jul. 20, 2023

(30) Foreign Application Priority Data

Jan. 20, 2022 (CN) .......................... 202210068877.9

(51) Int. Cl.
*H04L 9/00* (2022.01)
*H04L 9/08* (2006.01)

(52) U.S. Cl.
CPC ............ *H04L 9/003* (2013.01); *H04L 9/0869* (2013.01)

(58) Field of Classification Search
CPC ..... H04L 9/003; H04L 9/0869; H04L 9/0861; H04L 2209/08; G06F 21/602; G06F 21/64

See application file for complete search history.

(56) References Cited

U.S. PATENT DOCUMENTS

| | | | | |
|---|---|---|---|---|
| 5,892,900 A | * | 4/1999 | Ginter | ..................... H04L 63/20 726/26 |
| 6,112,187 A | * | 8/2000 | Fukawa | ................ H04L 9/0662 713/184 |
| 6,330,674 B1 | | 12/2001 | Angelo et al. | |

(Continued)

FOREIGN PATENT DOCUMENTS

| | | | | |
|---|---|---|---|---|
| CN | 1199892 A | * | 11/1998 | ........... G06Q 20/206 |
| CN | 101695021 A | | 4/2010 | |

(Continued)

*Primary Examiner* — John B King
(74) *Attorney, Agent, or Firm* — Winston Hsu (57) ABSTRACT

A method for performing a power disturbing operation to reduce a success rate of cryptosystem power analysis attack, an associated cryptosystem processing circuit and an associated electronic device are provided. The method includes: generate at least one random number; generating a plurality of power disturbing parameters respectively corresponding to a plurality of bit calculation phases according to the at least one random number, where the plurality of bit calculation phases represent a plurality of cryptosystem processing phases related to a predetermined cryptosystem, and correspond to a plurality of private key bits of a private key, respectively; and according to the plurality of power disturbing parameters, enabling at least one predetermined circuit of a plurality of predetermined circuits in the plurality of bit calculation phases, respectively, to use power corresponding to the plurality of power disturbing parameters to perform the power disturbing operation in the plurality of bit calculation phases, respectively.

9 Claims, 6 Drawing Sheets

(56) References Cited

U.S. PATENT DOCUMENTS

| | | |
|---|---|---|
| 7,519,643 B2 | 4/2009 | Har et al. |
| 8,472,621 B2 | 6/2013 | Daemen et al. |
| 10,218,387 B2 | 2/2019 | David |
| 10,726,108 B2 | 7/2020 | Hoogerbrugge et al. |
| 11,115,210 B2 | 9/2021 | Loisel et al. |
| 11,545,418 B2 * | 1/2023 | Chauhan ................. H01L 21/50 |
| 2005/0195975 A1 * | 9/2005 | Kawakita .............. H04L 9/3236 380/30 |
| 2007/0140478 A1 * | 6/2007 | Komano ............... H04L 9/0618 380/28 |
| 2008/0219438 A1 * | 9/2008 | Ebeid .................... H04L 9/3066 380/30 |
| 2008/0275932 A1 | 11/2008 | Ebeid |
| 2017/0302435 A1 * | 10/2017 | Yu ........................... G06F 21/72 |
| 2022/0150046 A1 * | 5/2022 | Dinu ....................... H04L 9/003 |

FOREIGN PATENT DOCUMENTS

| | | | | |
|---|---|---|---|---|
| CN | 102509036 A | * | 6/2012 | |
| CN | 107306180 B | | 5/2020 | |
| JP | 2004163687 A | * | 6/2004 | ............ G06F 7/725 |
| JP | 2008067349 A | * | 3/2008 | |
| TW | 201820200 A | | 6/2018 | |
| WO | WO-2006103851 A1 | * | 10/2006 | ........... H04L 9/0662 |

* cited by examiner

METHOD FOR PERFORMING POWER DISTURBING OPERATION TO REDUCE SUCCESS RATE OF CRYPTOSYSTEM POWER ANALYSIS ATTACK, CRYPTOSYSTEM PROCESSING CIRCUIT, AND ELECTRONIC DEVICE

BACKGROUND OF THE INVENTION

1. Field of the Invention

The present invention is related to cryptosystem protection, and more particularly, to a method for performing a power disturbing operation to reduce a success rate of cryptosystem (e.g. a Rivest-Shamir-Adleman (RSA) cryptosystem, an advanced encryption standard (AES) cryptosystem, or an elliptic curve cryptosystem (ECC), but the present invention is not limited thereto) power analysis attack, an associated cryptosystem processing circuit, and an associated electronic device.

2. Description of the Prior Art

According to related art, a private key may be utilized to perform RSA decryption calculation. Some problems may occur, however. For example, if an attacker can obtain consumed power of processing each bit in the RSA calculation, the attacker may obtain the private key from one processing architecture without proper protection. In the related art, some advices are provided to try to address this problem, but may cause additional problems (e.g. certain side effects). As a result, a novel method and associated architecture are needed for realizing an electronic device with a reliable cryptosystem without introducing any side effect or in a way that is less likely to introduce a side effect.

SUMMARY OF THE INVENTION

It is therefore an objective of the present invention to provide a method for performing a power disturbing operation to reduce a success rate of cryptosystem power analysis attack (e.g. RSA cryptosystem power analysis attack), an associated cryptosystem processing circuit, and an associated electronic device, to address the above-mentioned problems.

According to at least one embodiment of the present invention, a method for performing a power disturbing operation to reduce a success rate of cryptosystem power analysis attack is provided. The method may include: utilizing a random number generating circuit to generate at least one random number; generating a plurality of power disturbing parameters corresponding to a plurality of bit calculation phases according to the at least one random number, wherein the plurality of bit calculation phases represent a plurality of cryptosystem processing phases related to a predetermined cryptosystem, and correspond to a plurality of private key bits of a private key, respectively; and according to the plurality of power disturbing parameters, enabling at least one predetermined circuit of a plurality of predetermined circuits in the plurality of bit calculation phases, respectively, to utilize power corresponding to the plurality of power disturbing parameters to perform the power disturbing operation in the plurality of bit calculation phases, respectively.

According to some embodiments of the present invention, a cryptosystem processing circuit operated according to the above-mentioned method is provided. The cryptosystem processing circuit may include a core circuit and at least one integrated clock gating circuit. The core circuit may be arranged to control a plurality of cryptosystem processing operations related to the predetermined cryptosystem of the cryptosystem processing circuit, wherein the core circuit generates the plurality of power disturbing parameters corresponding to the plurality of bit calculation phases, respectively, according to the at least one random number. The at least one integrated clock gating circuit may be arranged to perform a clock gating operation in the cryptosystem processing circuit, wherein the plurality of predetermined circuits comprise the at least one integrated clock gating circuit.

According to some embodiments of the present invention, an electronic device including the above-mentioned cryptosystem processing circuit is further provided, wherein the electronic device may include at least one processor, a memory controller, and a communications interface circuit. The at least one processor may be arranged to control operations of the electronic device. The memory controller may be arranged to control a memory to temporarily store information for the electronic device. The communications interface circuit may be arranged to perform communications operations for the electronic device. For example, any of the at least one processor, the memory controller, and the communications interface circuit may include one of the plurality of predetermined circuits.

One of the benefits of the present invention is that, by carefully designing the control mechanism, the method of the present invention can prevent any attacker from obtaining the power difference of processing each bit in the RSA calculation, and thus can reduce the probability of obtaining the private key. In addition, the cryptosystem that is implemented according to the method of the present invention in the electronic device will not increase the cost greatly. Compared with the related art, the method of the present invention can realize an electronic device with a robust cryptosystem introducing no or less side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
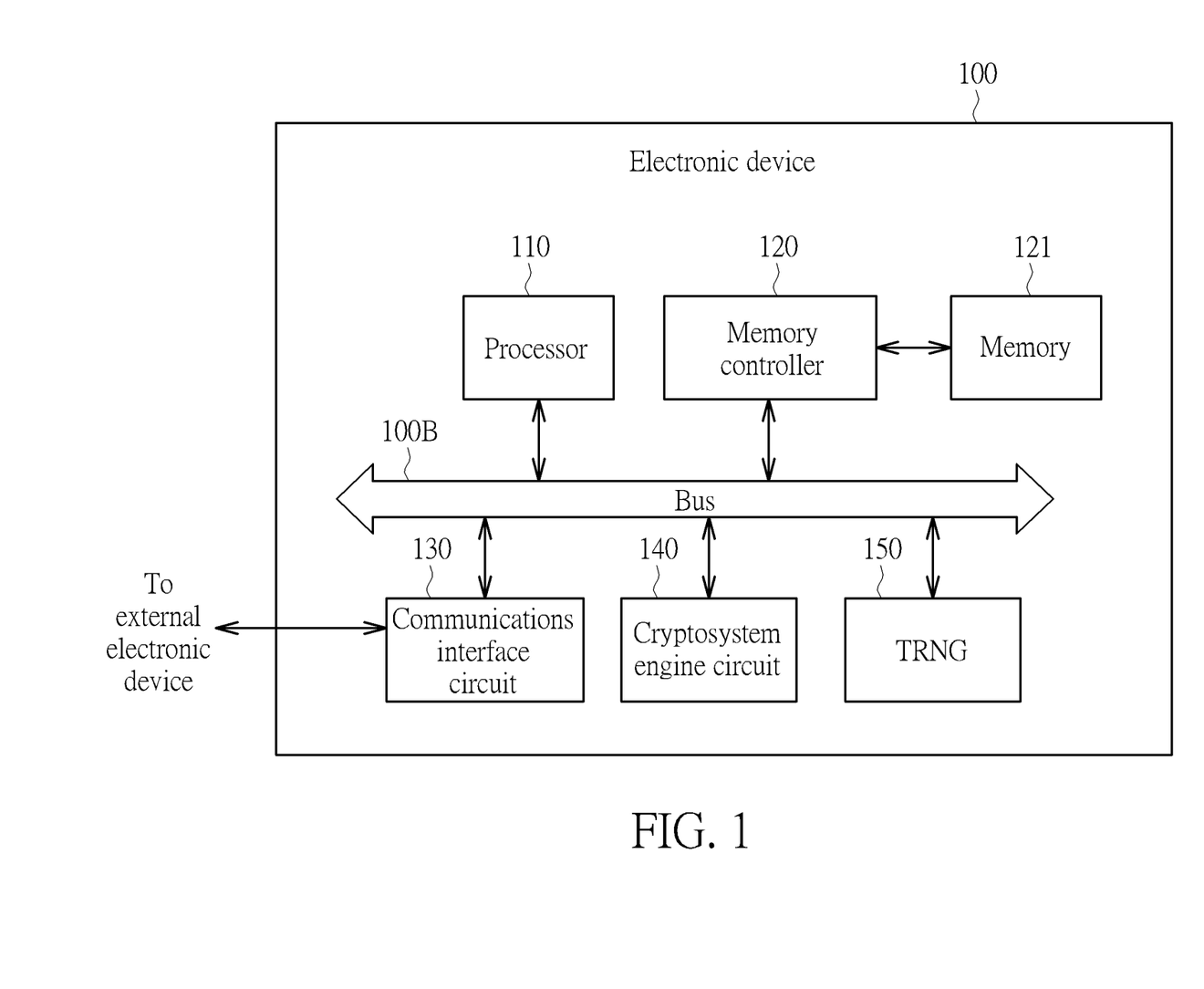
FIG. 1 is a diagram illustrating an electronic device with cryptosystem processing function according to an embodiment of the present invention.

FIG. 1 is a diagram illustrating an electronic device 100 with cryptosystem processing function according to an embodiment of the present invention. The electronic device 100 may include at least one processor (e.g. one or more processors; which may be referred to as a processor 110), a memory controller 120, a memory 121, a communications circuit 130, a cryptosystem engine circuit 140, and a random number generating circuit (e.g. a true random number generator (TRNG) 150), and these components may be coupled to each other through a bus 100B, wherein a control circuit of the electronic device 100 may include the processor 110, the memory controller 120, the communications interface circuit 130, the cryptosystem engine circuit 140, and the TRNG 150, and may be implemented by a system on chip (SoC), but the present invention is not limited thereto. For example, the random number generating circuit may be implemented by a linear feedback shift register or any types of a random number generator (RNG). In some embodiments, the random number generating circuit (e.g. the TRNG 150) may be integrated into the cryptosystem engine circuit 140. In addition, the electronic device 100 may further include a storage module (not shown) for storing system data, user data, etc.

According to this embodiment, the processor 110 may be arranged to control operations of the electronic device 100, and utilize the memory controller 120 to control the memory 121, to temporarily store information for the electronic device 100 (e.g. the processor 110). Under the control of the processor 110, the communications interface circuit 130 may perform communications operations for the electronic device 100, and more particularly, may be coupled to an external electronic device to communicate with the external electronic device (for brevity, labeled as "To external electronic device"). In addition, the cryptosystem engine circuit 140 may provide the cryptosystem processing function, such that the electronic device 100 may utilize a predetermined cryptosystem to protect important data, such as the system data, the user data, and communications data (e.g. the data transmitted/received by the communications operations).

For better comprehension, the electronic device 100 may represent a storage device (e.g. a universal serial bus (USB) flash drive or a solid state drive (SSD)), and the external electronic device may represent a control device that utilizes the electronic device 100 to store the user data (e.g. a desktop computer or a laptop computer), wherein the storage module may include a storage medium that is arranged to store the user data (e.g. a flash memory), but the present invention is not limited thereto. In some embodiments, the type of the electronic device 100 and/or the architecture shown in FIG. 1 may vary.

According to some embodiments, the predetermined cryptosystem may be a Rivest-Shamir-Adleman (RSA) cryptosystem and the cryptosystem engine circuit 140 may be an RSA cryptosystem engine circuit, but the present invention is not limited thereto. In some embodiments, the predetermined cryptosystem may be an elliptic curve cryptosystem (ECC), and the cryptosystem engine circuit 140 may be an ECC engine circuit; or the predetermined cryptosystem may be an advanced encryption standard (AES) cryptosystem, and the cryptosystem engine circuit 140 may be an AES cryptosystem engine circuit.

Figure 2:
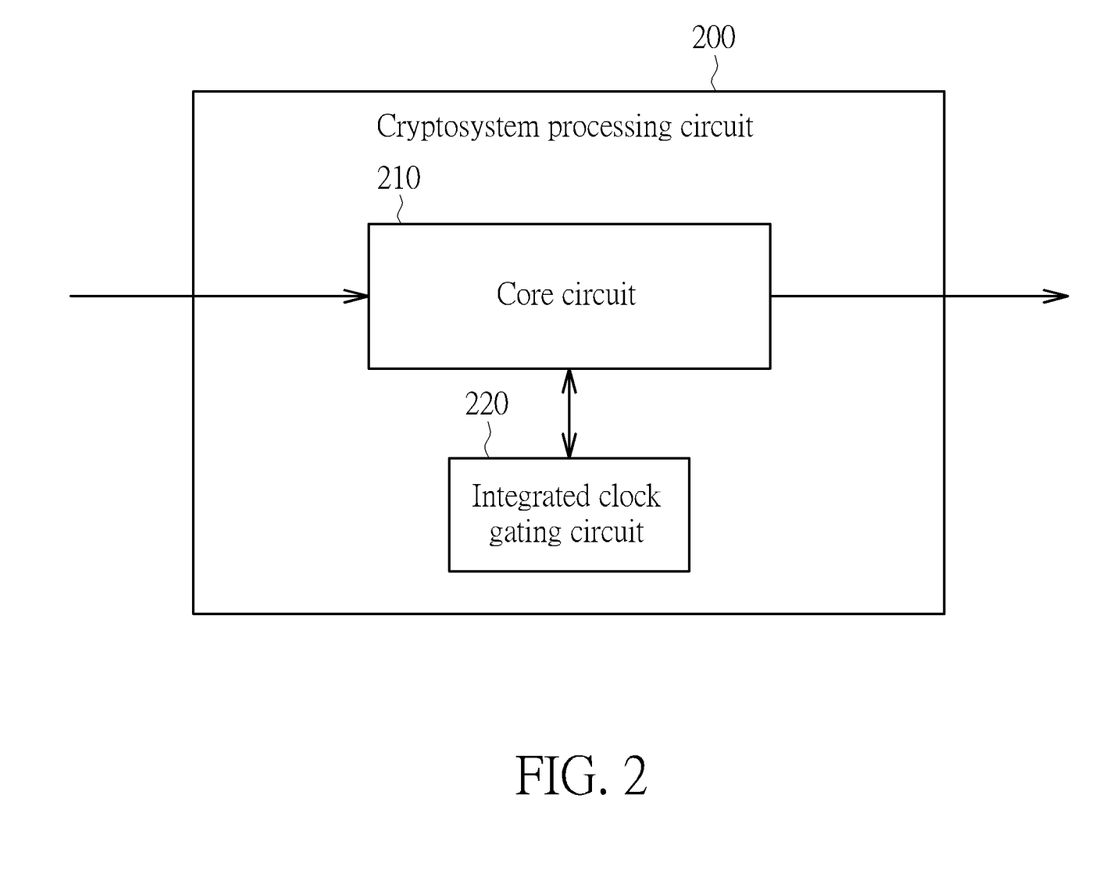
FIG. 2 is a diagram illustrating a cryptosystem processing circuit according to an embodiment of the present invention, wherein the cryptosystem processing circuit shown in FIG. 2 may act as an example of the cryptosystem engine circuit shown in FIG. 1.

FIG. 2 is a diagram illustrating a cryptosystem processing circuit 200 according to an embodiment of the present invention, wherein the cryptosystem processing circuit 200 shown in FIG. 2 may act as an example of the cryptosystem engine circuit 140 shown in FIG. 1, but the present invention is not limited thereto. The cryptosystem processing circuit 200 may include a core circuit 210 and at least one integrated clock gating circuit (e.g. one or more integrated clock gating circuits; which may be referred to as an integrated clock gating circuit 220). For example, the core circuit 210 may control a plurality of cryptosystem processing operations (e.g. a decryption operation and/or an encryption operation) related to the predetermined cryptosystem in the cryptosystem processing circuit 200, and may utilize the integrated clock gating circuit 220 to perform a clock gating operation in the cryptosystem processing circuit 200. In addition, the cryptosystem processing circuit 200 may further include secondary calculation circuits (not shown), such as a subtraction circuit and an addition circuit, for accelerating the plurality of cryptosystem processing operations.

Figure 3:
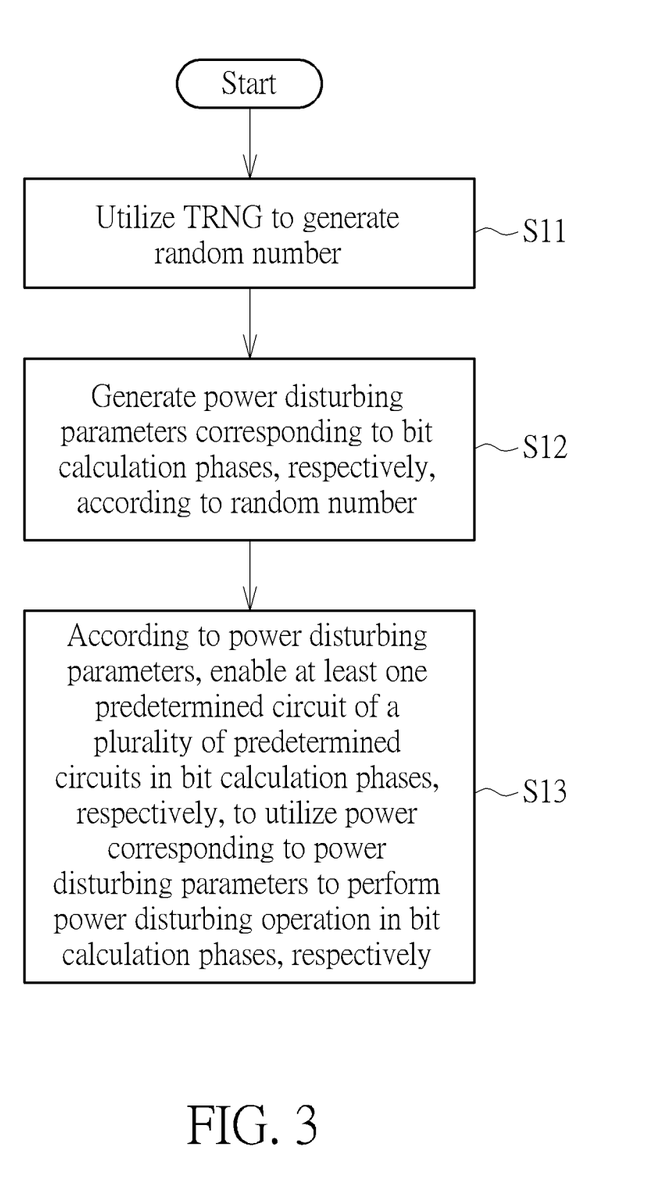
FIG. 3 is a flow chart of a method for performing a power disturbing operation to reduce a success rate of cryptosystem power analysis attack (e.g. RSA cryptosystem power analysis attack).

FIG. 3 is a flow chart of a method for performing a power disturbing operation to reduce a success rate of cryptosystem power analysis attack (e.g. RSA cryptosystem power analysis attack). The method may be applicable to the electronic device 100 shown in FIG. 1 and the components therein (e.g. the processor 110, the memory controller 120, the communications interface circuit 130, and the cryptosystem engine circuit 140), and more particularly, may be applicable to the cryptosystem processing circuit 200 shown in FIG. 2. For example, the predetermined cryptosystem may represent the RSA cryptosystem, and the cryptosystem processing circuit 200 may represent an RSA cryptosystem processing circuit, but the present invention is not limited thereto.

In Step S11, the cryptosystem processing circuit 200 (e.g. the core circuit 210) may utilize the random number generating circuit (e.g. the TRNG 150) to generate at least one random number (e.g. one or more random numbers).

In Step S12, the cryptosystem processing circuit 200 (e.g. the core circuit 210) may generate a plurality of power disturbing parameters corresponding to a plurality of bit calculation phases, respectively, according to the at least one random number, wherein the plurality of bit calculation phases may represent a plurality of cryptosystem processing phases related to the predetermined cryptosystem, and may correspond to a plurality of private key bits of a private key.

In Step S13, according to the plurality of power disturbing parameters, the cryptosystem processing circuit 200 (e.g. the core circuit 210) may enable at least one predetermined circuit (e.g. one or more predetermined circuits) of a plurality of predetermined circuits in the plurality of bit calculation phases, respectively, to utilize power corresponding to the plurality of power disturbing parameters to perform the power disturbing operation in the plurality of bit calculation phases, respectively. For example, the plurality of predetermined circuits may include the above-mentioned at least one integrated clock gating circuit (e.g. the integrated clock gating circuit 220), but the present invention is not limited thereto. More particularly, any of the processor 110, the memory controller 120, and the communications interface circuit 130 may include one of the plurality of predetermined circuits.

For better comprehension, the method may be illustrated by a work flow shown in FIG. 3, but the present invention is not limited thereto. According to some embodiments, one or more steps may be added, deleted, or modified in the work flow shown in FIG. 3. In addition, the plurality of private key bits may be X private key bits {BIT (x)|x=0, 1, . . . , (X−1)} of the private key, the plurality of bit calculation phases may be X bit calculation phases {PHASE (x)|x=0, 1, . . . , (X−1)}, the plurality of power disturbing parameters may be X power disturbing parameters {$P_{DISTURB}$(x)|x=0, 1, . . . , (X−1)}, and the cryptosystem processing circuit 200 (e.g. the core circuit 210) may enable the above-mentioned at least one predetermined circuit of the plurality of predetermined circuits in the X bit calculation phases {PHASE (x)|x=0, 1, . . . , (X−1)}, respectively, to utilize power {P(x)|x=0, 1, . . . , (X−1)} corresponding to the X power disturbing parameters {$P_{DISTURB}$(x)|x=0, 1, . . . , (X−1)} to perform the power disturbing operation in the X bit calculation phases {PHASE(x)|x=0, 1, . . . , (X−1)}, respectively.

According to some embodiments, the plurality of predetermined circuits may be a group of integrated clock gating circuits. For example, the cryptosystem processing circuit 200 (e.g. the core circuit 210) may dynamically detect a plurality of integrated clock gating circuits {ICG} (e.g. an integrated clock gating circuit ICG1 shown in FIG. 4, an integrated clock gating circuit ICG2 shown in FIG. 4, etc.) in the electronic device 100, to find out a plurality of idle integrated clock gating circuit {$ICG_{IDLE}$} from the plurality of integrated clock gating circuits {ICG}, for acting as the group of the integrated clock gating circuits, wherein the plurality of idle integrated clock gating circuit {$ICG_{IDLE}$} represent integrated clock gating circuits that do not currently output any clock signal, and respective output clock signals (e.g. gating output clock signals) of these integrated clock gating circuits is currently closed, but the present invention is not limited thereto. For another example, whether all of the plurality of integrated clock gating circuits {ICG} are idle, the cryptosystem processing circuit 200 (e.g. the core circuit 210) may utilize the above-mentioned all of the plurality of integrated clock gating circuits {ICG} to act as the group of the integrated clock gating circuits.

Figure 4:
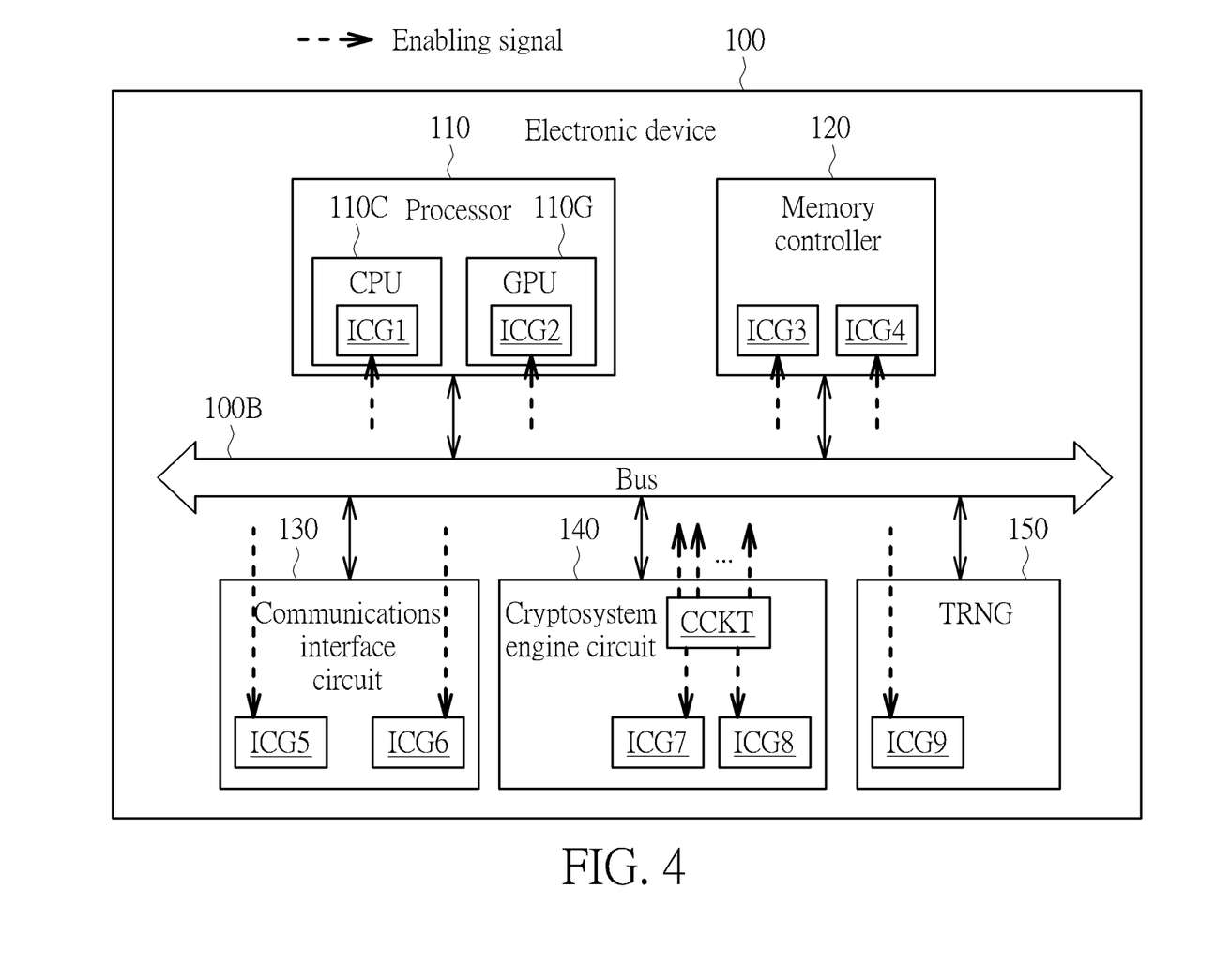
FIG. 4 is a diagram illustrating a predetermined circuit configuration control scheme of the method according to an embodiment of the present invention.

FIG. 4 is a diagram illustrating a predetermined circuit configuration control scheme of the method according to an embodiment of the present invention. For better comprehension, the processor 110 may include a plurality of processors (e.g. a central processing unit (CPU) 110C and a graphics processing unit (GPU) 110G), and the plurality of integrated clock gating circuits {ICG} may include multiple integrated clock gating circuits ICG1-ICG9, wherein the integrated clock gating circuits ICG1 and ICG2 may be located at the CPU 110C and the GPU 110G, respectively, and the integrated clock gating circuits {ICG3, ICG4}, {ICG5, ICG6}, {ICG7, ICG8}, and ICG9 may be located at the memory controller 120, the communications interface circuit 130, the cryptosystem engine circuit 140, and the TRNG 150, respectively, but the present invention is not limited thereto. In some embodiments, the number of the plurality of integrated clock gating circuits {ICG} and/or the distribution of the plurality of integrated clock gating circuits {ICG} may vary.

A core circuit CCKT (e.g. the core circuit 210) in the cryptosystem engine circuit 140 may generate a plurality of enabling signals, and more particularly, may selectively utilize the plurality of enabling signals to enable the plurality of integrated clock gating circuits {ICG}, such as the integrated clock gating circuits ICG1-ICG9. For example, the plurality of integrated clock gating circuits {ICG}, such as the integrated clock gating circuits ICG1-ICG9, may have respective power {P}, such as predetermined power values P1-P9. In any X bit calculation phase (e.g. the bit calculation phase PHASE(x)) of the X bit calculation phases {PHASE (x)|x=0, 1, . . . , (X−1)}, the core circuit CCKT (which may be implemented by, for example, the core circuit 210 shown in FIG. 2) may enable one or more integrated clock gating circuits in the plurality of integrated clock gating circuits {ICG} according to a corresponding power disturbing parameter (e.g. the power disturbing parameter $P_{DISTURB}$(x)) in the plurality of power disturbing parameters, such as the X power disturbing parameters {$P_{DISTURB}$(x)|x=0, 1, . . . , (X−1)}, to utilize one or more respective power {P} (e.g. the predetermined power values P1-P9) of the plurality of integrated clock gating circuits {ICG} to generate a total disturbing power (e.g. a sum of a subset of the predetermined power values P1-P9), for acting as a dynamic power P_dyn(x) to perform the power disturbing operation (e.g. the power disturbing operation regarding the bit calculation phase PHASE(x) or the private key bit BIT(x)). When any attacker tries to detect an original power P_ori(x) of the electronic device 100 in the bit calculation phase PHASE(x), the attacker is forced to measure a total power P_all(x) as follows:

$$P\_all(x)=P\_ori(x)+P\_dyn(x);$$

wherein the total power P_all(x) varies with the original power P_ori(x) and the dynamic power P_dyn(x).

Since generating the plurality of power disturbing parameters (e.g. the X power disturbing parameters {$P_{DISTURB}$(x) |x=0, 1, . . . , (X−1)}) according to the at least one random number is random, respective total disturbing power (e.g. various combinations of the predetermined power values P1-P9, such as the dynamic power {P_dyn(x)|x=0, 1, . . . , (X−1)}) of the plurality of bit calculation phases (e.g. the X bit calculation phases {PHASE(x)|x=0, 1, . . . , (X−1)}) is also random, which makes the total power {P_all(x)| x=0, 1, . . . , (X−1)} also random. As a result, the electronic device 100 operated according to the method can prevent the attacker from obtaining the difference between the original power {P_ori(x)|x=0, 1, . . . , (X−1)} of processing each bit (e.g. the X private key bits {BIT(x)|x=0, 1, . . . , (X−1)}) in the plurality of cryptosystem processing operations (e.g. the decryption operation and/or the encryption operation), and thus can reduce the probability of obtaining the private key. For brevity, similar descriptions for this embodiment are not repeated in detail here.

According to some embodiments, a random number RDN may include Y random number bits RDN[(Y−1):0], such as the $(Y-1)^{th}$ bit RDN (Y−1) to the $0^{th}$ bit RDN(0), wherein the bit RDN (Y−1) and the bit RDN(0) represent the most significant bit (MSB) and the least significant bit (LSB) of the random number RDN, respectively. The random number RDN may act as an example of the at least one random number. The core circuit CCKT (which may be implemented by, for example, the core circuit 210 shown in FIG. 2) in the cryptosystem engine circuit 140 may control Y idle integrated clock gating circuits {$ICG_{IDLE}$ (y)|y=0, 1, . . . , (Y−1)} in the plurality of integrated clock gating circuits {ICG} according to the Y random number bits RDN [(Y−1):0], and more particularly, may selectively enable the integrated clock gating circuits $ICG_{IDLE}$ (0), $ICG_{IDLE}$ (1), . . . , $ICG_{IDLE}$ (Y−1) according to whether the bits RDN(0), RDN (1), . . . , RDN (Y−1) are equal to a first predetermined logical value (e.g. a logical value 1), respectively. If the bit RDN (y) is equal to the first predetermined logical value (e.g. the logical value 1), the core circuit CCKT (e.g. the core circuit 210) may enable the integrated clock gating circuit $ICG_{IDLE}$ (y) to turn on the output clock signal of the integrated clock gating circuit $ICG_{IDLE}$ (y); otherwise, when the bit RDN (y) is equal to a second predetermined logical value (e.g. a logical value 0), the core circuit CCKT (e.g. the core circuit 210) may disable the integrated clock gating circuit $ICG_{IDLE}$ (y) to turn off (more particularly, keep turning off) the output clock signal of the integrated clock gating circuit $ICG_{IDLE}$(y).

For better comprehension, it is assumed that Y=4, and the Y idle integrated clock gating circuits {$ICG_{IDLE}$ (0), $ICG_{IDLE}$ (1), ..., $ICG_{IDLE}$ (Y−1)}, such as 4 idle integrated clock gating circuits {$ICG_{IDLE}$ (0), $ICG_{IDLE}$ (1), $ICG_{IDLE}$ (2), $ICG_{IDLE}$ (3)} represent the integrated clock gating circuits {ICG2, ICG3, ICG5, ICG8}, respectively, which represents the bits RDN(0), RDN (1), RDN (2), and RDN (3) (from LSB to MSB) of the random number RDN may be arranged to control the integrated clock gating circuits ICG2, ICG3, ICG5, and ICG8, respectively, but the present invention is not limited thereto. For example, when A=4'b1010, the core circuit CCKT (which may be implemented by, for example, the core circuit 210 shown in FIG. 2) may enable the integrated clock gating circuits ICG3 and ICG8, and disable the integrated clock gating circuits ICG2 and ICG5. When A=4'b0111, the core circuit CCKT (which may be implemented by, for example, the core circuit 210 shown in FIG. 2) may enable the integrated clock gating circuits ICG2, ICG3, and ICG5, and disable the integrated clock gating circuit ICG8. For brevity, similar descriptions for these embodiments are not repeated in detail here.

According to some embodiments, the core circuit CCKT (which may be implemented by, for example, the core circuit 210 shown in FIG. 2) may read 1024 bits from the random number generating circuit (e.g. the TRNG 150) in advance, and utilize 4 bits each time as the random number RDN. For example, in 256 subsequent bit calculation phases (e.g. ECC bit calculation phases or RSA bit calculation phases), the core circuit CCKT (e.g. the core circuit 210) may utilize 4 bits in the 1024 bits as the random number RDN in any of the 256 subsequent bit calculation phases. For brevity, similar descriptions for these embodiments are not repeated in detail here.

Figure 5:
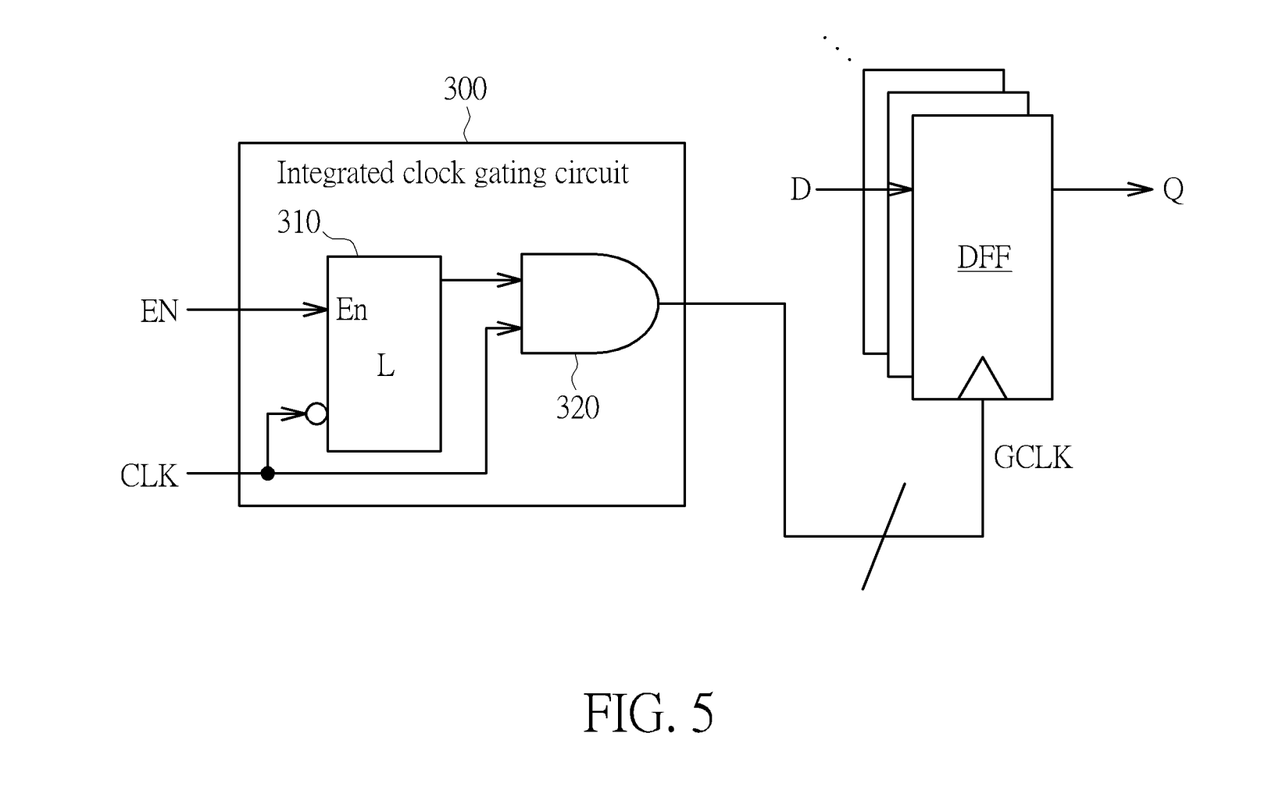
FIG. 5 is a diagram illustrating an integrated clock gating circuit involved in the predetermined circuit configuration control scheme according to an embodiment of the present invention.

FIG. 5 is a diagram illustrating an integrated clock gating circuit 300 involved in the predetermined circuit configuration control scheme according to an embodiment of the present invention, wherein multiple D-type flip-flops (DFFs) may be illustrated as subsequent stage circuits of the integrated clock gating circuit 300 for better comprehension. The integrated clock gating circuit 300 shown in FIG. 5 may act as an example of any integrated clock gating circuit ICG of the plurality of integrated clock gating circuits {ICG}, and more particularly, may act as an example of any of the integrated clock gating circuits ICG1-ICG9 shown in FIG. 4.

The integrated clock gating circuit 300 may include a latch 310 (for brevity, labeled as "L") and an AND gate 320, wherein an enable terminal En of the latch 310 may be arranged to receive an enabling signal EN. The integrated clock gating circuit 300 may receive a clock signal CLK, and utilize an inverter to perform inversion upon the clock signal CLK to generate an inverted signal, for inputting to a clock input terminal of the latch 310. The AND gate 320 may AND the clock signal CLK and the output signal of the latch 310, to generate a gating clock signal GCLK, wherein the same gating clock signal GCLK may be arranged to act as respective input clocks of the multiple DFFs, for controlling the multiple DFFs to generate respective data output signals Q according to the respective data input signals D. For brevity, similar descriptions for this embodiment are not repeated in detail here.

Figure 6:
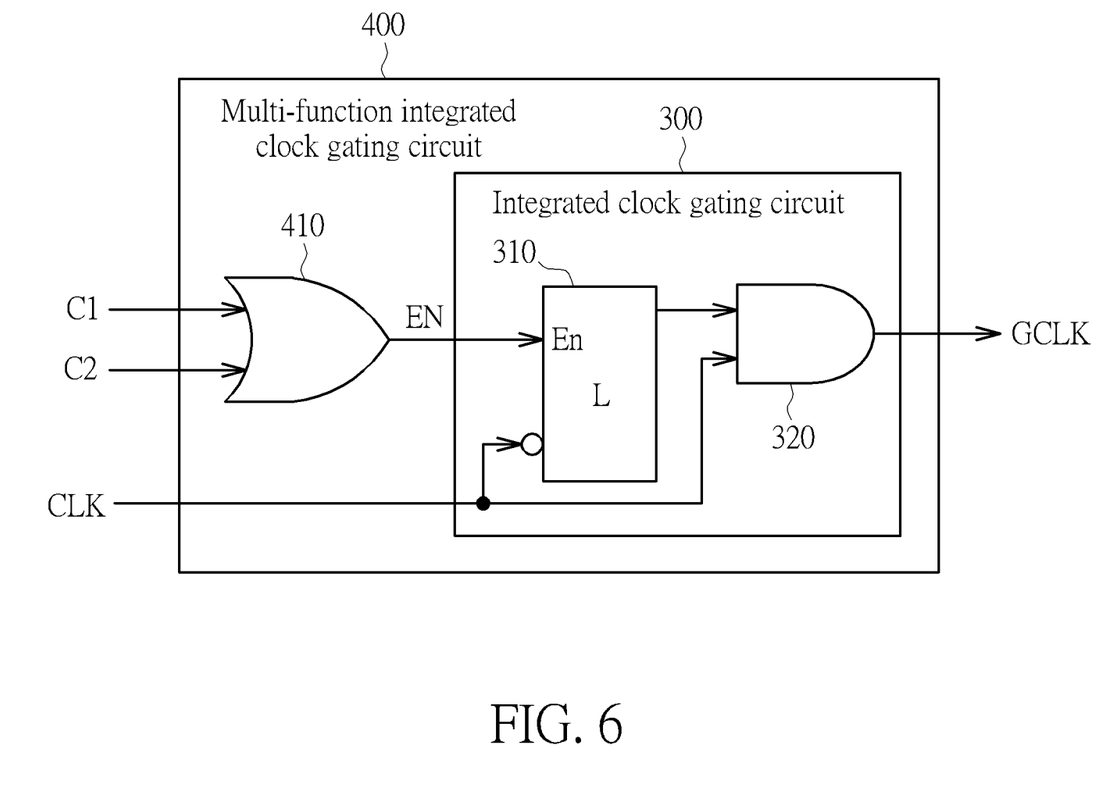
FIG. 6 is a diagram illustrating a multi-function enabling control scheme of the method according to an embodiment of the present invention.

FIG. 6 is a diagram illustrating a multi-function enabling control scheme of the method according to an embodiment of the present invention, wherein a multi-function integrated clock gating circuit 400 that is implemented according to the multi-function enabling control scheme may include an OR gate 410 and the integrated clock gating circuit 300 shown in FIG. 5. The any integrated clock gating circuit ICG of the plurality of the integrated clock gating circuits {ICG}, such as the integrated clock gating circuit 300, may be coupled to a first enabling signal C1 or a second enabling signal C2 through the OR gate 410, to allow at least one enabling signal of the first enabling signal C1 and the second enabling signal C2 to enable the any integrated clock gating circuit ICG of the plurality of the integrated clock gating circuits {ICG}, such as the integrated clock gating circuit 300.

For better comprehension, the first enabling signal C1 may correspond to an original function of the any integrated clock gating circuit ICG (e.g. the integrated clock gating circuit 300), and the second enabling signal C2 may correspond to a power disturbing function of the any integrated clock gating circuit ICG (e.g. the integrated clock gating circuit 300). The core circuit CCKT (which may be implemented by, for example, the core circuit 210 shown in FIG. 2) may enable the any integrated clock gating circuit ICG (e.g. the integrated clock gating circuit 300) through the second enabling signal C2, wherein the enabling signal C2 may act as an example of the enabling signal shown in FIG. 4. For brevity, similar descriptions for this embodiment are not repeated in detail here.

Regarding the plurality of cryptosystem processing operations, some implementation details are further illustrated as follows. The cryptosystem processing circuit 200 may perform the plurality of cryptosystem processing operations (e.g. the decryption operation and/or the encryption operation) according to binary exponentiation algorithm or modular exponentiation algorithm in RSA scalar multiplication, to accelerate the calculation speed, and more particularly, calculate $A^k$ mod N. It is assumed that a, n, m are integers, n≥0, 0≤a<m, and ($a^n$ mod m) is required to be calculated. For example:

$$n=205=(11001101)_2=2^7+2^6+2^3+2^2+2^0;$$

wherein the symbol "$(\ )_2$" may represent a binary value. In the above-mentioned calculation, only 4 more modular multiplication operations are required to generate ($a^{205}$ mode m):

$$a^{205}=(a^{\wedge}2^7 \times a^{\wedge}2^6 \times a^{\wedge}2^3 \times a^{\wedge}2^2 \times a^{\wedge}2^0) \bmod m;\ \text{or}$$

$$a^{205}=a^{2^7} \cdot a^{2^6} \cdot a^{2^3} \cdot a^{2^2} \cdot a \bmod m;$$

for better comprehension, the above-mentioned calculation may be expressed in pseudocode as follows:

Integer fastExp2 (Integer a, Integer n, Integer m)
if (n==0)
  return 1;
z=a; //z=$a^{m\_0}$
for (i=(k−1), (k−2), . . . , 0)
  if ($\beta_i$==0)
    z=$z^2$ mod m; //z=$a^{m\_i+1}$→z=$a^{m\_i}$
  else
    z=$z^2$a mod m; //z=$a^{m\_i+1}$→z=$a^{m\_i}$
return z;
in the above-mentioned pseudocode, the symbol "$\beta_i$" may represent any bit value in the binary representation {$\beta_{k-1}$, $\beta_{k-2}$, . . . , $\beta_0$} of n. For example:

$$n=205=\{\beta_7,\beta_6,\beta_5,\beta_4,\beta_3,\beta_2,\beta_1,\beta_0\};$$

wherein $\beta_0=\beta_2=\beta_3=\beta_6=\beta_7$=1'b1 (i.e. single bit $(1)_2$), and $\beta_1=\beta_4=\beta_5$=1'b0 (i.e. single bit $(0)_2$).

It is assumed that the method of scanning from MSB to LSB is utilized, and $a^{205}$ may be expressed as follows:

$$a^{\wedge}205=(((((((a^{\wedge}2 \times a)^{\wedge}2)^{\wedge}2) \times a)^{\wedge}2 \times a)^{\wedge}2)^{\wedge}2 \times a;$$

in the above-mentioned equation, "^2" (i.e. the power of 2) may be referred to as a point double calculation operation, and "xa" may be referred to as a point add calculation operation. The above-mentioned equation may be rewritten as:

$$a^{\wedge}205 = a^{\wedge}(2^{\wedge}7) \times a^{\wedge}(2^{\wedge}6) \times a^{\wedge}(2^{\wedge}3) \times a^{\wedge}(2^{\wedge}2) \times a; \text{ or}$$

$$a^{\wedge}205 = a^{\wedge}(2^{\wedge}7 + 2^{\wedge}6 + 2^{\wedge}3 + 2^{\wedge}2 + 2^{\wedge}0).$$

It is noted that, the point double calculation operation is performed every time a scanning step of 1 bit is moved. When the $6^{th}$ bit is scanned after the $7^{th}$ bit, the cryptosystem processing circuit 200 may detect that the $6^{th}$ bit is equal to 1, and may first perform the point double calculation operation (e.g. a square operation) and then perform the point addition calculation operation; when the $5^{th}$ bit is scanned after the $6^{th}$ bit, the cryptosystem processing circuit 200 may detect that the $5^{th}$ bit is equal to 0, and may only perform the point double calculation operation (e.g. a square operation); and the rest can be deduced by analogy. The n may be referred to as a private key. Since the private key is typically an exponent in the relevant computation (e.g. the computation of ($A^k$ mod N)), if a person can know the computation currently being done is the point double calculation operation or the point addition calculation operation according to the power difference, the person can easily find out the private key.

As mentioned above, the plurality of bit calculation phases may represent the plurality of cryptosystem processing phases related to the predetermined cryptosystem (e.g. the RSA cryptosystem), and may correspond to the plurality of private key bits of the private key, respectively. The electronic device 100 operated according to the method can prevent any attacker from obtaining the power difference of processing each bit in the plurality of cryptosystem processing operations (e.g. the decryption operation and/or the encryption operation), and thus can reduce the probability of obtaining the private key.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing a power disturbing operation to reduce a success rate of a cryptosystem power analysis attack, comprising:
    utilizing a random number generating circuit to generate at least one random number;
    generating a plurality of power disturbing parameters corresponding to a plurality of bit calculation phases, respectively, according to the at least one random number, wherein the plurality of bit calculation phases represent a plurality of cryptosystem processing phases related to a predetermined cryptosystem, and the plurality of bit calculation phases correspond to a plurality of private key bits of a private key, respectively; and
    according to the plurality of power disturbing parameters, enabling at least one integrated clock gating circuit of a plurality of integrated clock gating circuits in the plurality of bit calculation phases, respectively, to utilize power corresponding to the plurality of power disturbing parameters to perform the power disturbing operation in the plurality of bit calculation phases, respectively;
    wherein a plurality of target circuits are clocked by the plurality of integrated clock gating circuits, respectively, and power of each of the plurality of target circuits is changed based on enablement of a corresponding integrated clock gating circuit; and the plurality of target circuits includes at least one of a processor, a memory controller, a communication interface circuit and a true random number generator of an electronic device to which the predetermined cryptosystem corresponds.

2. The method of claim 1, wherein the plurality of integrated clock gating circuits represent a group of integrated clock gating circuits.

3. The method of claim 2, further comprising:
    dynamically detecting a plurality of integrated clock gating circuits, to find out a plurality of idle integrated clock gating circuits as the group of integrated clock gating circuits.

4. The method of claim 2, further comprising:
    no matter whether all of the plurality of integrated clock gating circuits are idle or not, utilizing all of the plurality of integrated clock gating circuits to act as the group of the integrated clock gating circuits.

5. The method of claim 4, wherein any of the plurality of integrated clock gating circuits is coupled to a first enabling signal and a second enabling signal through an OR gate, and the method further comprises:
    allowing at least one enabling signal of the first enabling signal and the second enabling signal to enable the any of the plurality of integrated clock gating circuits.

6. The method of claim 5, wherein the first enabling signal corresponds to an original function of the any of the plurality of integrated clock gating circuits, and the second enabling signal corresponds to a power disturbing function of the any of the plurality of integrated clock gating circuits.

7. The method of claim 1, wherein the plurality of integrated clock gating circuits are distributed among multiple components of an electronic device.

8. A cryptosystem processing circuit executing the method of claim 1, comprising:
    a core circuit, arranged to control a plurality of cryptosystem processing operations that are related to the predetermined cryptosystem in the cryptosystem processing circuit, wherein the core circuit generates the plurality of power disturbing parameters corresponding to the plurality of bit calculation phases, respectively, according to the at least one random number; and
    at least one integrated clock gating circuit, arranged to perform a clock gating operation in the cryptosystem processing circuit, wherein the plurality of integrated clock gating circuits comprise the at least one integrated clock gating circuit.

9. An electronic device, comprising:
    at least one processor, arranged to control operations of the electronic device;
    a memory controller, arranged to control a memory to temporarily store information for the electronic device; and
    a communications interface circuit, arranged to perform communications operations for the electronic device; and
    a cryptosystem processing circuit, wherein the cryptosystem processing circuit is arranged to perform operations of:
        utilizing a random number generating circuit to generate at least one random number, generating a plurality of power disturbing parameters corresponding to a plurality of bit calculation phases, respectively, according to the at least one random number, wherein the plurality of bit calculation phases represent a plurality of cryptosystem processing phases related to a predetermined cryptosystem, and the plurality of bit calculation phases correspond to a plurality of private key bits of a private key, respectively; and according to the plurality of power disturbing parameters, enabling at least one integrated clock gating circuit of a plurality of integrated clock gating circuits in the plurality of bit calculation phases, respectively, to utilize power corresponding to the plurality of power disturbing parameters to perform the power disturbing operation in the plurality of bit calculation phases, respectively;

wherein a plurality of target circuits of the electronic device are clocked by the plurality of integrated clock gating circuits, respectively, and power of each of the plurality of target circuits is changed based on enablement of a corresponding integrated clock gating circuit; and the plurality of target circuits includes at least one of the processor, the memory controller, the communication interface circuit and a true random number generator of the electronic device.

* * * * *